US011629676B2

(12) United States Patent
Kwak et al.

(10) Patent No.: US 11,629,676 B2
(45) Date of Patent: Apr. 18, 2023

(54) COVER RIGIDITY REINFORCEMENT MEMBER OF AIR CLEANER AND AIR CLEANER INCLUDING THE SAME

(71) Applicants: Hyundai Motor Company, Seoul (KR); Kia Motors Corporation, Seoul (KR)

(72) Inventors: Seong-Youn Kwak, Suwon-si (KR); Ju-Ho Han, Suwon-si (KR); Sung-Min Yang, Incheon (KR); Sang-Jun Ahn, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 201 days.

(21) Appl. No.: 17/157,395

(22) Filed: Jan. 25, 2021

(65) Prior Publication Data

US 2022/0136467 A1    May 5, 2022

(30) Foreign Application Priority Data

Oct. 29, 2020  (KR) .................. 10-2020-0141792

(51) Int. Cl.
*F02M 35/02* (2006.01)
*B01D 46/52* (2006.01)
*B01D 46/00* (2022.01)
*B01D 46/64* (2022.01)

(52) U.S. Cl.
CPC ..... *F02M 35/0201* (2013.01); *B01D 46/0005* (2013.01); *B01D 46/521* (2013.01); *B01D 46/64* (2022.01); *B01D 2271/02* (2013.01); *B01D 2279/60* (2013.01)

(58) Field of Classification Search
CPC ......... F02M 35/0201; F02M 35/02491; F02M 35/02425; F02M 35/1277; F02M 35/02416; B01D 46/0005; B01D 46/521; B01D 46/64; B01D 2271/02; B01D 2279/60; B01D 46/0002; B01D 2265/05; B01D 2265/06
See application file for complete search history.

(56) References Cited

U.S. PATENT DOCUMENTS

2002/0166312 A1* 11/2002 Phelps ................. F02M 35/024
                                                                55/497
2007/0144154 A1*  6/2007 Keller ..................... B01D 46/10
                                                                60/289
(Continued)

FOREIGN PATENT DOCUMENTS

CN      106640437 A  *  5/2017
CN      106853302 A  *  6/2017
(Continued)

*Primary Examiner* — Hung Q Nguyen
(74) *Attorney, Agent, or Firm* — Slater Matsil, LLP

(57) ABSTRACT

An air cleaner includes an intake filter seated on an air cleaner body, an air cleaner cover spaced apart from the intake filter and coupled to the air cleaner body, and a cover rigidity reinforcement member detachably coupled to the intake filter and configured to restrict displacement toward the intake filter. The intake filter includes a non-woven fabric configured to filter foreign matters of introduced outside air, and a filter frame surrounding and fixing a circumference of the non-woven fabric.

20 Claims, 10 Drawing Sheets

(56) References Cited

U.S. PATENT DOCUMENTS

| | | | |
|---|---|---|---|
| 2011/0308213 A1* | 12/2011 | Gillispie | B01D 46/521 55/499 |
| 2012/0110962 A1* | 5/2012 | Dewit | B01D 46/525 55/357 |
| 2013/0199143 A1* | 8/2013 | Zou | F02M 35/02425 55/495 |
| 2014/0130467 A1* | 5/2014 | Herman | B01D 50/20 55/414 |
| 2015/0068174 A1 | 3/2015 | Krisko et al. | |
| 2016/0051909 A1* | 2/2016 | Fedak | B01D 46/10 55/501 |
| 2018/0008923 A1 | 1/2018 | Burton et al. | |
| 2018/0207566 A1* | 7/2018 | Stanhope | B01D 35/306 |
| 2018/0236391 A1* | 8/2018 | Dexter | B01D 46/0005 |

FOREIGN PATENT DOCUMENTS

| | | | | |
|---|---|---|---|---|
| DE | 102004006601 A1 * | 9/2005 | | B01D 46/0004 |
| DE | 102015003755 A1 * | 9/2016 | | |
| DE | 102016002246 A1 * | 8/2017 | | B01D 46/0002 |
| DE | 102016002247 A1 * | 8/2017 | | B01D 46/0005 |
| DE | 112017001554 T5 * | 12/2018 | | B01D 46/0005 |
| DE | 102017006074 A1 * | 1/2019 | | B01D 46/0002 |
| EP | 3000521 A1 * | 3/2016 | | B01D 46/0039 |
| EP | 3744966 A1 * | 12/2020 | | B01D 46/0004 |
| JP | H07217510 A * | 8/1995 | | |
| JP | 4167897 B2 * | 10/2008 | | B01D 39/1623 |
| JP | 2011153613 A * | 8/2011 | | |
| JP | 2011169194 A * | 9/2011 | | |
| JP | 2015021474 A * | 2/2015 | | |
| JP | 2015121122 A * | 7/2015 | | |
| JP | 2020104061 A * | 7/2020 | | |
| KR | 840001286 Y1 * | 7/1984 | | |
| KR | 101531342 B1 | 6/2015 | | |
| KR | 101714219 B1 | 3/2017 | | |
| KR | 20170058553 A | 5/2017 | | |
| KR | 20190032060 A | 3/2019 | | |
| WO | WO-2012055102 A1 * | 5/2012 | | B01D 46/10 |
| WO | WO-2012095419 A1 * | 7/2012 | | B01D 46/0002 |
| WO | WO-2013139992 A1 * | 9/2013 | | B01D 46/0005 |
| WO | WO-2018191147 A1 * | 10/2018 | | B01D 46/0005 |

* cited by examiner

COVER RIGIDITY REINFORCEMENT MEMBER OF AIR CLEANER AND AIR CLEANER INCLUDING THE SAME

CROSS-REFERENCE TO RELATED APPLICATIONS

This application claims priority to Korean Patent Application No. 10-2020-0141792, filed on Oct. 29, 2020, which application is hereby incorporated herein by reference.

TECHNICAL FIELD

The present disclosure relates to an air cleaner.

BACKGROUND

An air cleaner for a vehicle is mounted to remove dust or silt in the air sucked into an engine, thereby preventing the abrasion of a cylinder, and preventing the noise caused when the air is sucked into the cylinder.

However, there is a problem in that the noise excessively occurs on the front seat and rear seat of the interior at a specific revolution per minute (RPM), for example, 2,200 RPM band (220 Hz).

This is caused by the excessive vibration of an air cleaner box due to the deterioration of the rigidity of the air cleaner. That is, this is caused by the radiating sound of the air cleaner box (cover) and the vertical shrinkage due to the suction pressure.

Therefore, a conventional air cleaner 10 illustrated in FIG. 1 adopts a stopper 11 between a cover and a non-woven fabric, but such a structure requires the air cleaner cover to be detached in order to replace a filter, has the increased filter cost and maintenance cost caused by adding the stopper 11 and the support structure thereof, and has difficulty in fastening the air cleaner cover due to the stopper 11 and the support structure thereof.

The contents described in this section are to help the understanding of the background of the present disclosure, and may include what is not previously known to those skilled in the art to which the present disclosure pertains.

SUMMARY

The present disclosure relates to an air cleaner. Particular embodiments relate to a member for reinforcing the cover rigidity of the air cleaner.

Embodiments of the present disclosure are devised to solve problems in the related art, and an embodiment of the present disclosure provides a cover rigidity reinforcement member of an air cleaner and the air cleaner including the same, which may reduce the noise due to the air cleaner cover and facilitate the replacement.

An air cleaner according to one embodiment of the present disclosure includes an intake filter seated on an air cleaner body, an air cleaner cover spaced apart from the intake filter and coupled to the air cleaner body, and a cover rigidity reinforcement member detachably coupled to the intake filter to restrict the displacement toward the intake filter of the air cleaner cover.

Further, the intake filter includes a non-woven fabric that filters foreign matters of introduced outside air and a filter frame surrounding and fixing the circumference of the non-woven fabric.

Further, the cover rigidity reinforcement member includes a reinforcement part having each of both ends fastened to the filter frame, and disposed to be spaced apart from the intake filter.

Here, a plurality of reinforcement pars is formed.

Furthermore, the reinforcement part may include a first reinforcement part and a second reinforcement part disposed to be spaced in parallel to each other.

Furthermore, the cover rigidity reinforcement member may further include a third reinforcement part connected between the first reinforcement part and the second reinforcement part.

Further, a rubber pad is mounted on the third reinforcement part.

Here, the third reinforcement part includes a pair of connection parts connected to each of the first reinforcement part and the second reinforcement part, a pair of inclined parts extending in the inclined direction upward from each of the pair of connection parts, and a flat part connected between the pair of inclined parts.

Further, each of the first reinforcement part and the second reinforcement part includes a pair of fastening parts formed with fastening holes into which fastening pins formed on the intake filter are inserted, a pair of inclined parts extending in the inclined direction upward from each of the pair of fastening parts, and a flat part connected between the pair of inclined parts.

Further, an insulator made of a rubber material is provided on the inner surface of the fastening hole.

Meanwhile, the first reinforcement part, the second reinforcement part, and the third reinforcement part are an I-beam having an I-type cross section.

Next, a cover rigidity reinforcement member of an air cleaner according to one embodiment of the present disclosure includes a first reinforcement part and a second reinforcement part having both ends detachably fastened to a filter frame of an air cleaner, and disposed to be spaced in parallel to each other and a third reinforcement part connected between the first reinforcement part and the second reinforcement part.

Further, a rubber pad is mounted on the third reinforcement part.

Further, each of the first reinforcement part and the second reinforcement part includes a pair of fastening parts formed with fastening holes, a pair of inclined parts extending in the inclined direction upward from each of the pair of fastening parts, and a flat part connected between the pair of inclined parts.

Further, the third reinforcement part may include a pair of connection parts connected to each of the first reinforcement part and the second reinforcement part, a pair of inclined parts extending in the inclined direction upward from each of the pair of connection parts, and a flat part connected between the pair of inclined parts.

Furthermore, an insulator made of a rubber material is provided on the inner surface of the fastening hole.

Meanwhile, the first reinforcement part, the second reinforcement part, and the third reinforcement part are an I-beam having an I-type cross section.

The air cleaner and the cover rigidity reinforcement member according to embodiments of the present disclosure may reduce the noise due to the air cleaner cover, and reduce the cost and improve the residual shrinkage (pumping) phenomenon which is a chronic problem of the intake system at the top of the engine compared to the conventional air cleaner and the cover rigidity reinforcement member.

DETAILED DESCRIPTION OF ILLUSTRATIVE EMBODIMENTS

To fully understand the present disclosure, the operational advantages of embodiments of the present disclosure, and an object achieved by the practice of embodiments of the present disclosure, the accompanying drawings illustrating preferred exemplary embodiments of the present disclosure and the contents illustrated in the accompanying drawings should be referred.

In describing the preferred exemplary embodiments of the present disclosure, the description of the known technology or the repetitive description which may unnecessarily obscure the gist of the present disclosure will be reduced or omitted.

Figure 1:
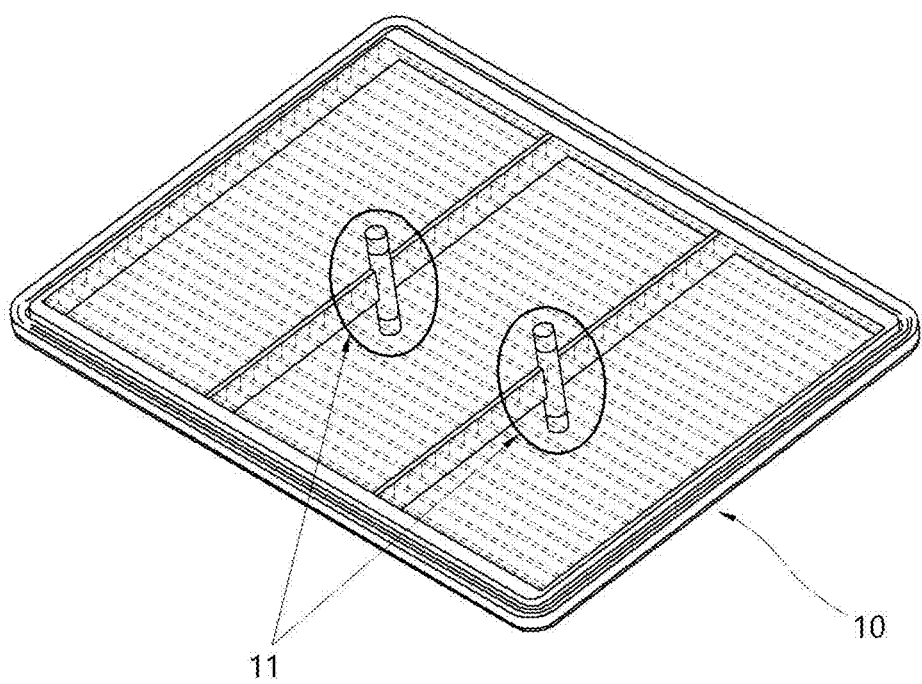
FIG. 1 schematically illustrates some components of a conventional air cleaner.
Figure 2:
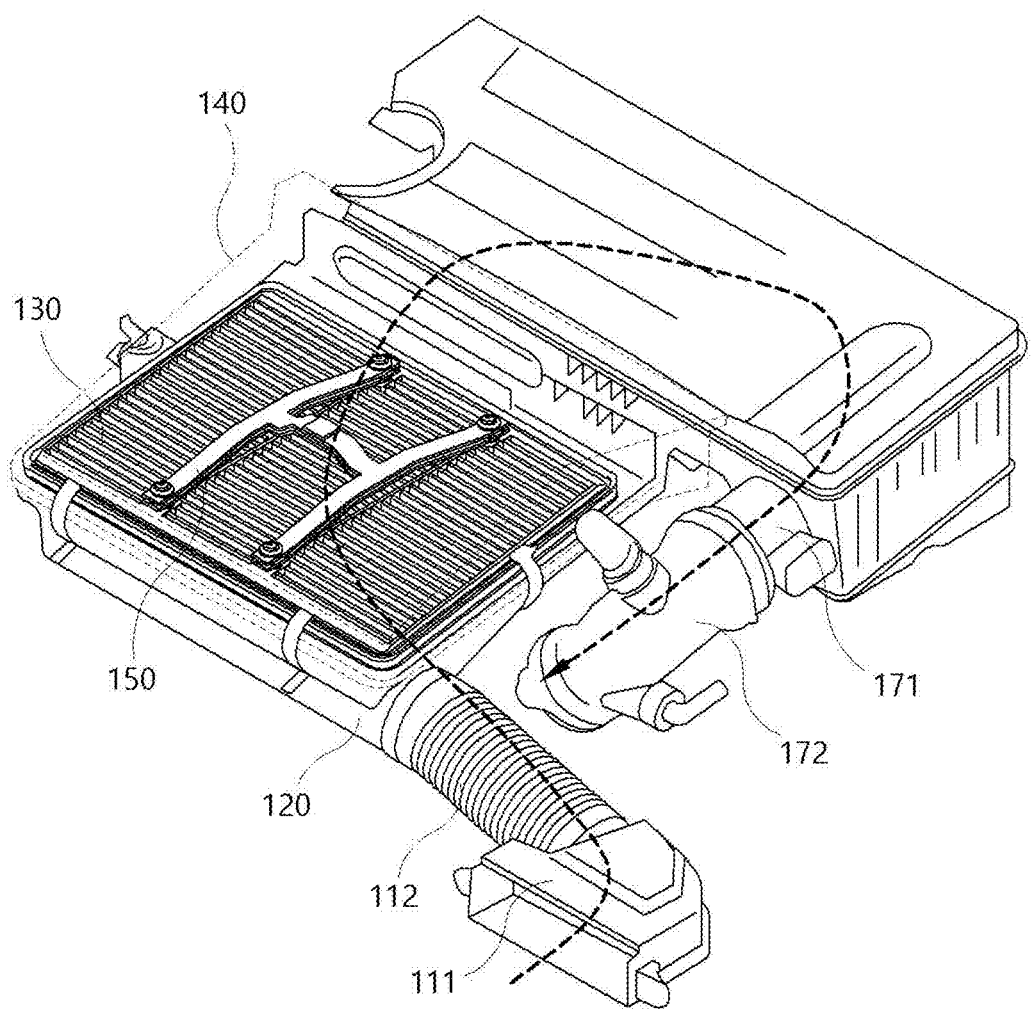
FIG. 2 illustrates an air cleaner and a cover rigidity reinforcement member according to embodiments of the present disclosure.
Figure 3:
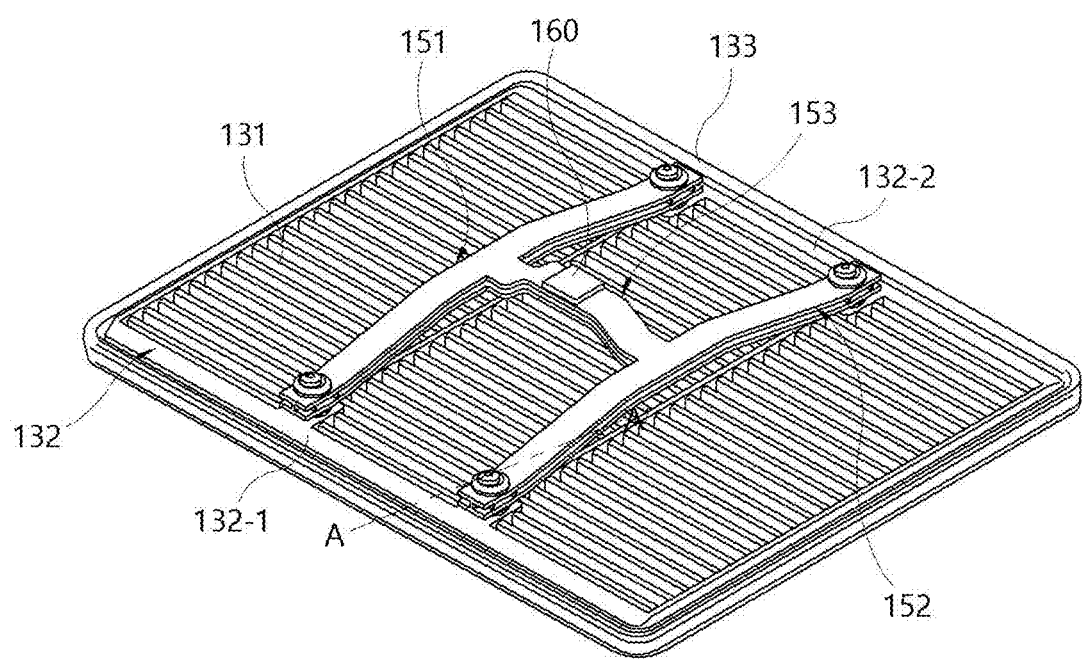
FIG. 3 separately illustrates the cover rigidity reinforcement member according to embodiments of the present disclosure.
Figure 4:
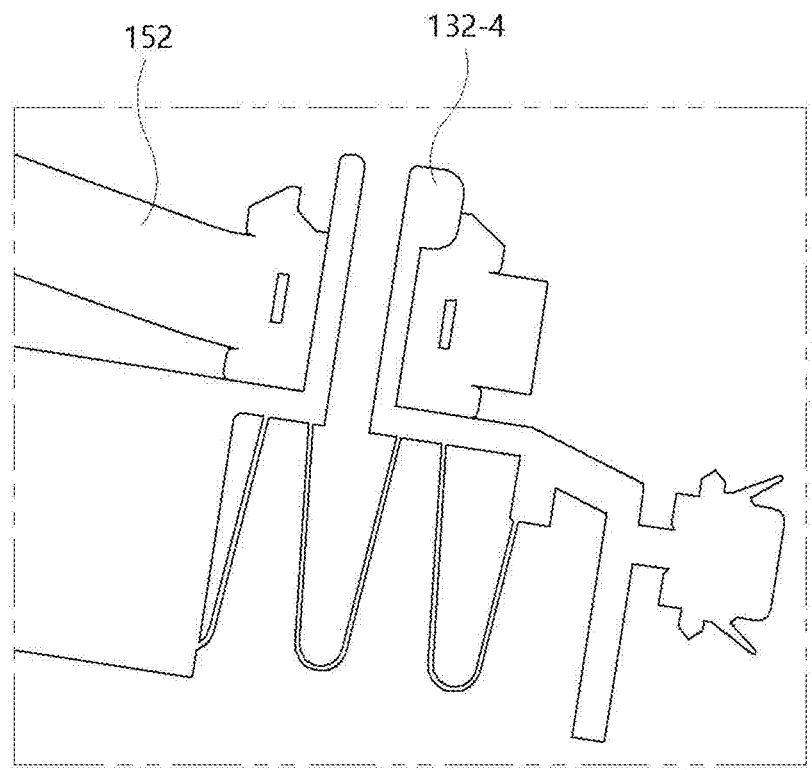
FIG. 4 is a diagram taken along the line A-A' illustrated in FIG. 3.
Figure 5:
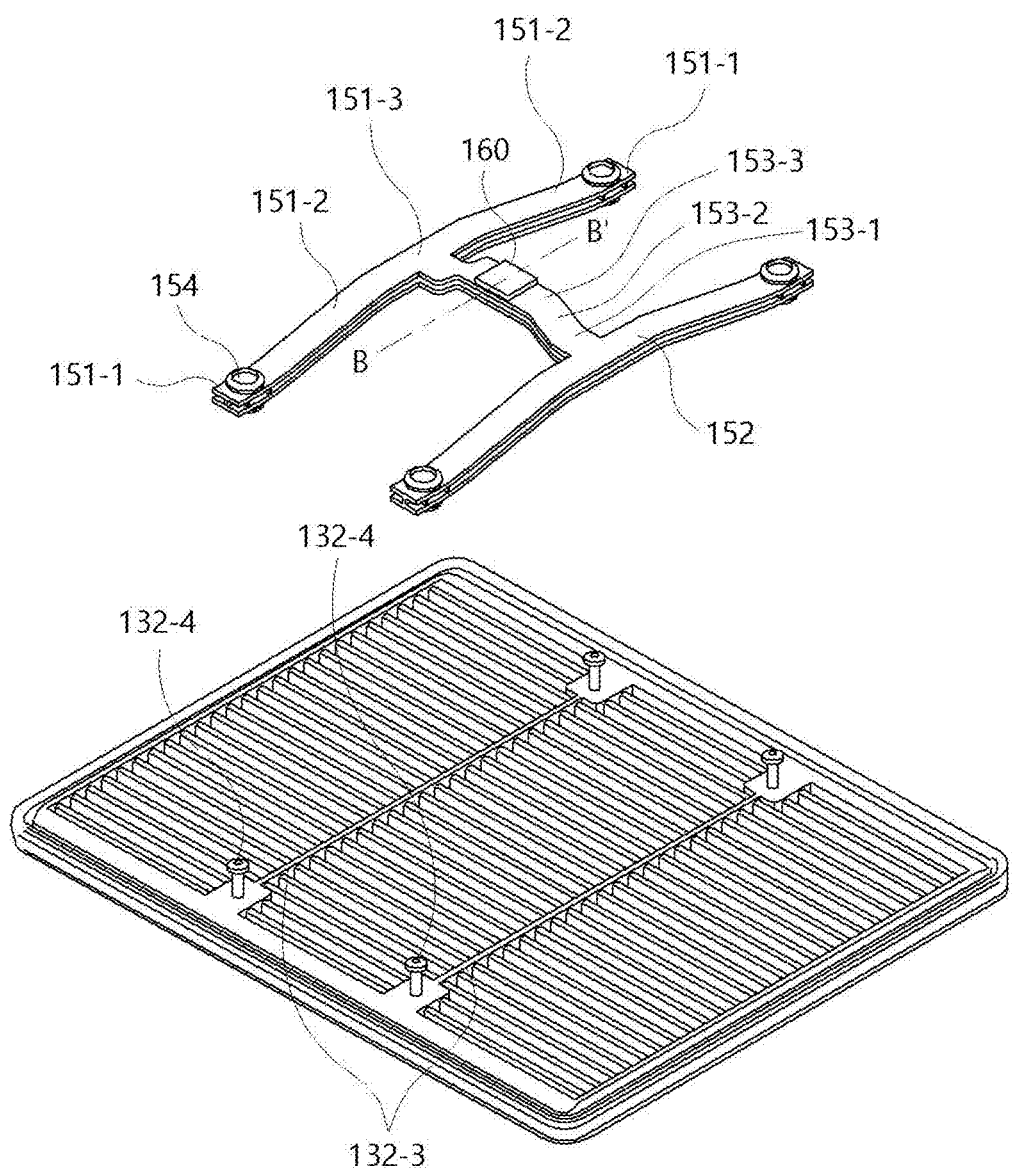
FIG. 5 is a partially exploded diagram of the cover rigidity reinforcement member illustrated in FIG. 3.
Figure 6:
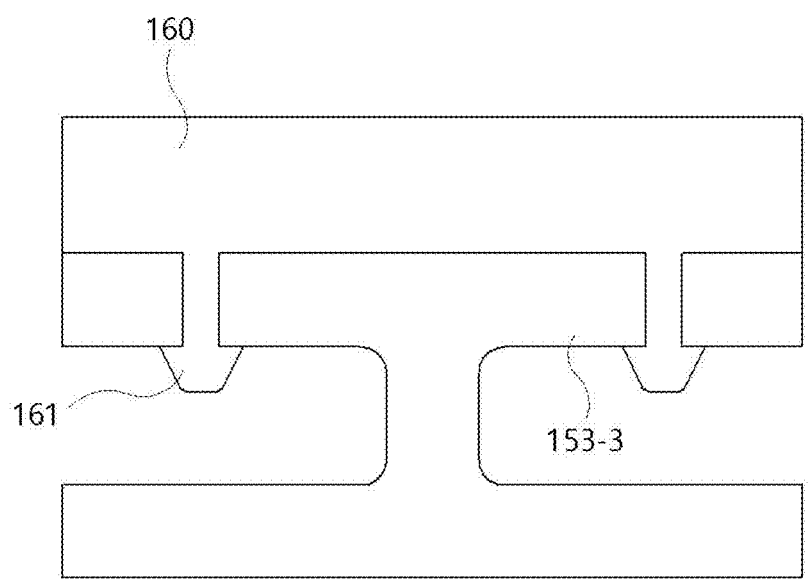
FIG. 6 is a diagram taken along the line B-B' illustrated in FIG. 5.

FIG. 2 illustrates an air cleaner and a cover rigidity reinforcement member according to embodiments of the present disclosure, FIG. 3 separately illustrates the cover rigidity reinforcement member according to embodiments of the present disclosure, and FIG. 4 is a diagram taken along the line A-A' illustrated in FIG. 3. Further, FIG. 5 is a partially exploded diagram of the cover rigidity reinforcement member illustrated in FIG. 3, and FIG. 6 is a diagram taken along the line B-B' illustrated in FIG. 5.

Hereinafter, a cover rigidity reinforcement member of an air cleaner and the air cleaner including the same according to an exemplary embodiment of the present disclosure will be described with reference to FIGS. 2 to 6.

An air cleaner has an intake filter 130 seated on an air cleaner body 120, and an air cleaner cover 140 coupled to the air cleaner body 120 to cover the top surface of the intake filter 130.

Outside air is introduced into a first intake duct 11, and introduced into the air cleaner body 120 through a second intake duct 112 coupled to one side of the air cleaner body 120.

The second intake duct 112 has a bellows in order to restrict the transfer of the vibration from an engine to the first intake duct 11.

The outside air introduced into the air cleaner body 120 is filtered by the intake filter 130, and then guided to be introduced into an electronic throttle control (ETC) through an intake hose 172.

The air cleaner body 120 is formed with a filter seating surface on which the intake filter 130 may be seated, and configured as a resonator integral type.

Further, the front end of the intake hose 172 is provided with an air flow sensor (AFS) 171 of suction air.

The air cleaner cover 140 is coupled to the air cleaner body 120 to cover the top surface of the intake filter 130, and detached and attached together when the intake filter 130 is detached and attached.

An embodiment of the present disclosure includes a cover rigidity reinforcement member 150 which may be detached from and attached to the intake filter 130 in order to alleviate the air cleaner cover 140 from being residually shrunk (pumped) by the suction pressure conventionally.

Referring to FIGS. 3 and 5, first, the intake filter 130 includes a non-woven fabric 131, a filter frame 132, and a seal rubber 133.

The non-woven fabric 131 filters foreign matters within the air introduced from the outside may be configured as a three-layered structure such as a bulky layer, an intermediate layer, and a dense layer, and collects dust by the mechanical coupling force.

The filter frame 132 is a frame for fixing the non-woven fabric 131, and may be injection-manufactured integrally with the non-woven fabric 131, and the seal rubber 133 serves as a cushioning material when the intake filter 130 is seated between the air cleaner body 120 and the air cleaner cover 140, and is provided to surround the circumference of the filter frame 132 to prevent the foreign matters from being introduced between the air cleaner body 120 and the air cleaner cover 140.

The filter frame 132 includes a first frame part 132-1 and a second frame part 132-2 which are opposite in parallel to each other, and includes an auxiliary frame part 132-3 vertically connected to the first frame part 132-1 and the second frame part 132-2.

Here, the first frame part 132-1 and the second frame part 132-2 may be frame parts forming the long sides of the filter frame 132.

Further, one auxiliary frame part 132-3 may be configured, and two or more may be disposed to be spaced apart from each other at regular intervals.

Further, a fastening pin 132-4 for fastening with the cover rigidity reinforcement member 150 may be formed on the filter frame 132, and the fastening pin 132-4 may be formed on the first frame part 132-1 and the second frame part 132-2, and formed on a connection frame part which is formed to have a sufficient area for mounting the fastening pin 132-4 on the connection point between the first frame part 132-1, the second frame part 132-2, and the auxiliary frame part 132-3.

The fastening pin 132-4 varies depending on the number of auxiliary frame parts 132-3, and a pair of fastening pins 132-4 are preferably formed on one auxiliary frame part 132-3.

Further, the upper end of the fastening pin 132-4 has an expanding shape and is formed with a hollow, and thus is forcibly fitted into the fastening hole of the cover rigidity reinforcement member, thereby not facilitating the separation, as illustrated in FIG. 4.

Next, the cover rigidity reinforcement member 150 includes a first reinforcement part 151 and a second reinforcement part 152 disposed in parallel to the auxiliary frame part 132-3 and fastened to the fastening pins 132-4 through the fastening holes formed in both ends thereof, and further includes a third reinforcement part 153 and a rubber pad 160.

The exemplary embodiment of the present disclosure has described as an example that the cover rigidity reinforcement member 150 is composed of two reinforcement parts of the first reinforcement part 151 and the second reinforcement part 152 and composed of the third reinforcement part 153 connecting the first reinforcement part 151 to the second reinforcement part 152, and the first reinforcement part 151, the second reinforcement part 152, and the third reinforcement part 153 are configured in the H form on the floor to have the shape which is advantageous for further strengthening the rigidity.

Meanwhile, the cover rigidity reinforcement member 150 is composed of one first reinforcement part 151, and may be formed such that the rubber pad 160 is mounted on the top surface of the first reinforcement part 151.

Further, the cover rigidity reinforcement member 150 may also be composed of three or more parallel reinforcement parts including reinforcement parts arranged in parallel to the first reinforcement part 151 and the second reinforcement part 152.

Since the first reinforcement part 151 and the second reinforcement part 152 restrict the residual shrinkage (pumping) of the air cleaner cover 140, that is, the displacement toward the intake filter, the intermediate ends thereof need to be spaced apart from the intake filter 130 and the first reinforcement part 151 and the second reinforcement part 152 may entirely have a curved bar shape.

Alternatively, the first reinforcement part 151 and the second reinforcement part 152 may be formed with bending parts and may have a trapezoidal shape excluding the bottom.

That is, each of the first reinforcement part 151 and the second reinforcement part 152 has fastening holes formed in flat fastening parts 151-1 corresponding to both side ends thereof, and may be composed of inclined parts 151-2 extending in the inclined direction upward from the fastening parts 151-1 and a flat part 151-3 flatly configured between both inclined parts 151-2.

An insulator 154 may be provided on the inner surface of the fastening hole.

The insulator 154 may be made of a rubber and easily detached and attached when the fastening pin 132-4 is fitted through the fastening hole, and serves to absorb the injection tolerance of the cover rigidity reinforcement member 150.

The third reinforcement part 153 connects the flat part 151-3 of the first reinforcement part 151 to the flat part of the second reinforcement part 152. That is, the third reinforcement part 153 is formed to extend in the direction perpendicular to both the flat parts, is also composed of a connection part 153-1, an inclined part 153-2, and a flat part 153-3 similar to the first reinforcement part 151 and the second reinforcement part 152, and may have a trapezoidal shape excluding the bottom.

Meanwhile, the third reinforcement part 153 having such a form also serves as a handle due to the trapezoidal shape.

Further, the rubber pad 160 is mounted on the flat part 153-3 of the third reinforcement part 153.

The rubber pad 160 serves as the damping between the cover rigidity reinforcement member 150 and the air cleaner cover 140, and as illustrated in FIG. 6, is coupled to the flat part 153-3 of the third reinforcement part 153 by the coupling pin 161, thereby serving as a buffer according to the overlap of the double plate of the third reinforcement part 153. Further, the edge of the coupling pin 161 is configured to have a wedge shape and coupled so as not to be easily separated.

Further, the third reinforcement part 153 is located on the uppermost portion by the trapezoidal shape, and for the harmony between the rigidity reinforcement member and the air cleaner cover 140, the bottom surface of the air cleaner cover 140 is formed with a groove corresponding to the third reinforcement part 153, such that the third reinforcement part 153 or the rubber pad 160 may reduce the shrinkage displacement while being seated in the groove of the lower surface of the air cleaner cover 140 when the shrinkage displacement of the air cleaner cover 140 occurs.

Furthermore, the first reinforcement part 151, the second reinforcement part 152, and the third reinforcement part 153 configuring the cover rigidity reinforcement member 150 may have the shape in which two bars are disposed to be spaced apart from each other, that is, the I-type beam form having the I-type cross section, thereby further strengthening the rigidity by itself.

Further, when the air cleaner is replaced, only the intake filter is replaced and the cover rigidity reinforcement member may be separated and re-used.

Figure 7A:
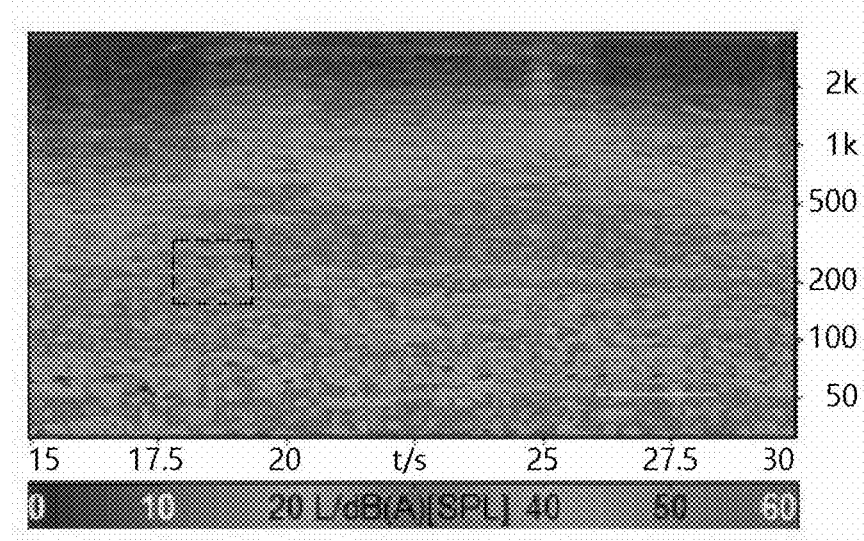
FIG. 7A illustrates the measurement result of the interior noise when the conventional air cleaner is applied.
Figure 7B:
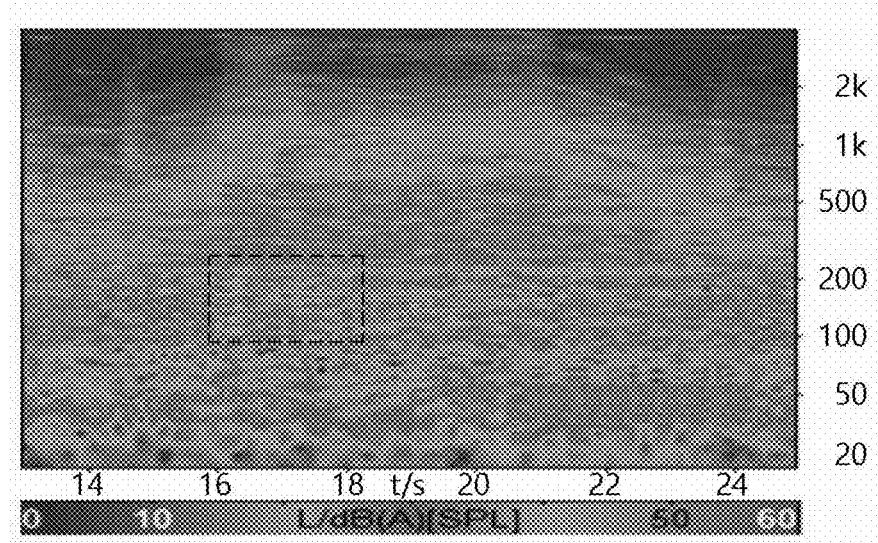
FIG. 7B illustrates the measurement result of the interior noise when the air cleaner according to embodiments of the present disclosure is applied.

FIG. 7A illustrates the measurement result of the interior noise when the conventional air cleaner is applied, and FIG. 7B illustrates the measurement result of the interior noise when the air cleaner according to embodiments of the present disclosure is applied.

Figure 8A:
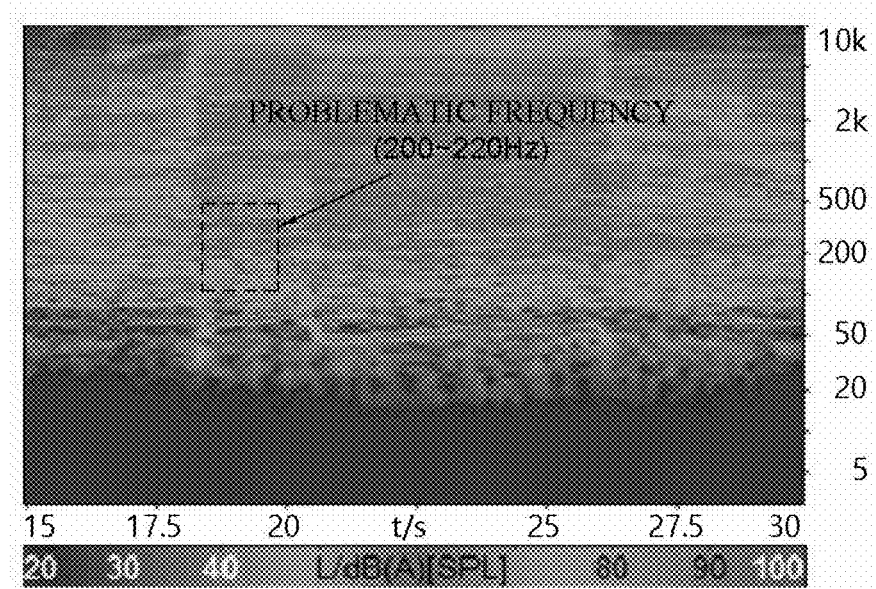
FIG. 8A illustrates the measurement result of the engine room noise when the conventional air cleaner is applied.
Figure 8B:
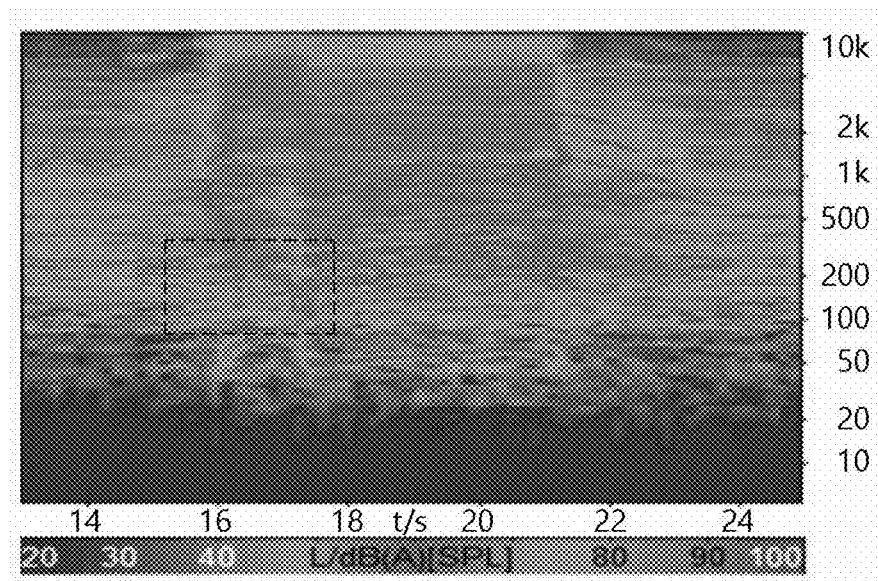
FIG. 8B illustrates the measurement result of the engine room noise when the air cleaner according to embodiments of the present disclosure is applied.

FIG. 8A illustrates the measurement result of the engine room noise when the conventional air cleaner is applied, and FIG. 8B illustrates the measurement result of the engine room noise when the air cleaner according to embodiments of the present disclosure is applied.

As illustrated in FIGS. 7A to 8B, it may be seen that an embodiment of the present disclosure has the reduced noise at 200 Hz to 220 Hz at which the noise occurs within the interior and the engine room.

The aforementioned present disclosure has been described with reference to the illustrated drawings but is not limited to the described exemplary embodiments, and it is apparent to those skilled in the art that the present disclosure may be variously modified and changed without departing from the spirit and scope of the present disclosure. Therefore, the modified examples or the changed examples should fall within the claims of the present disclosure, and the scope of the present disclosure should be interpreted based on the appended claims.

What is claimed is:
1. An air cleaner comprising:
an intake filter seated on an air cleaner body, the intake filter comprising:
a non-woven fabric configured to filter foreign matters of introduced outside air; and
a filter frame surrounding and fixing a circumference of the non-woven fabric, the filter frame comprising a first frame part and a second frame part disposed opposite to and parallel with the first frame part;
an air cleaner cover spaced apart from the intake filter and coupled to the air cleaner body; and
a cover rigidity reinforcement member detachably coupled to the intake filter and configured to restrict displacement toward the intake filter, the cover rigidity reinforcement member comprising:

a first reinforcement part having two ends detachably fastened to the first frame part and the second frame part, respectively;

a second reinforcement part spaced apart from and parallel to the first reinforcement part, the second reinforcement part having two ends detachably fastened to the first frame part and the second frame part, respectively; and a third reinforcement part connected between the first reinforcement part and the second reinforcement part.

2. The air cleaner of claim 1, further comprising a rubber pad mounted on the third reinforcement part.

3. The air cleaner of claim 1, wherein the third reinforcement part comprises:

a pair of connection parts connected to each of the first reinforcement part and the second reinforcement part, respectively;

a pair of inclined parts extending in an inclined direction upward from each of the pair of connection parts, respectively; and a flat part connected between the pair of inclined parts.

4. The air cleaner of claim 1, wherein the first reinforcement part, the second reinforcement part, and the third reinforcement part are an I-beam having an I-type cross section.

5. The air cleaner of claim 1, wherein each of the first reinforcement part and the second reinforcement part comprises:

a pair of fastening parts formed with fastening holes into which fastening pins formed on the intake filter are inserted;

a pair of inclined parts extending in an inclined direction upward from each of the pair of fastening parts, respectively; and a flat part connected between the pair of inclined parts.

6. The air cleaner of claim 5, wherein an insulator made of a rubber material is provided on an inner surface of the fastening holes.

7. A cover rigidity reinforcement member of an air cleaner comprising:

a first reinforcement part having two ends detachably fastened to a first frame part and a second frame part, respectively, of a filter frame of the air cleaner, wherein the first frame part and the second frame part are disposed opposite and parallel to each other;

a second reinforcement part having two ends detachably fastened to the first frame part and the second frame part, respectively, of the filter frame of the air cleaner, the first and second reinforcement parts disposed to be spaced in parallel to each other; and a third reinforcement part connected between the first reinforcement part and the second reinforcement part.

8. The cover rigidity reinforcement member of claim 7, further comprising a rubber pad mounted on the third reinforcement part.

9. The cover rigidity reinforcement member of claim 7, wherein each of the first reinforcement part and the second reinforcement part comprises:

a pair of fastening parts formed with fastening holes;

a pair of inclined parts extending in an inclined direction upward from each of the pair of fastening parts, respectively; and a flat part connected between the pair of inclined parts.

10. The cover rigidity reinforcement member of claim 9, further comprising an insulator made of a rubber material provided on an inner surface of the fastening holes.

11. The cover rigidity reinforcement member of claim 7, wherein the third reinforcement part comprises:

a pair of connection parts connected to each of the first reinforcement part and the second reinforcement part, respectively;

a pair of inclined parts extending in an inclined direction upward from each of the pair of connection parts, respectively; and a flat part connected between the pair of inclined parts.

12. The cover rigidity reinforcement member of claim 7, wherein the first reinforcement part, the second reinforcement part, and the third reinforcement part are an I-beam having an I-type cross section.

13. The cover rigidity reinforcement member of claim 7, wherein the first reinforcement part and the second reinforcement part each comprise a pair of fastening parts formed with fastening holes, a pair of inclined parts extending in an inclined direction upward from each of the pair of fastening parts, respectively, and a flat part connected between the pair of inclined parts; and wherein the third reinforcement part comprises a pair of connection parts connected to the flat parts of each of the first reinforcement part and the second reinforcement part respectively, a pair of inclined parts extending in an inclined direction upward from each of the pair of connection parts respectively, and a flat part connected between the pair of inclined parts.

14. The air cleaner of claim 13, wherein:

each of both ends of the first reinforcement part are detachably fastened to the first frame part and the second frame part, respectively; and each of both ends of the second reinforcement part are detachably fastened to the first frame part and the second frame part, respectively.

15. An air cleaner comprising:

an intake filter seated on an air cleaner body, the intake filter comprising:

a non-woven fabric configured to filter foreign matters of introduced outside air; and a filter frame surrounding and fixing a circumference of the non-woven fabric;

an air cleaner cover spaced apart from the intake filter and coupled to the air cleaner body; and a cover rigidity reinforcement member detachably coupled to the intake filter and configured to restrict displacement toward the intake filter, the cover rigidity reinforcement member comprising a plurality of reinforcement parts, the plurality of reinforcement parts comprising:

a first reinforcement part;

a second reinforcement part disposed to be spaced in parallel to the first reinforcement part; and a third reinforcement part connected between the first reinforcement part and the second reinforcement part, the third reinforcement part comprising:

a pair of connection parts connected to each of the first reinforcement part and the second reinforcement part, respectively;

a pair of inclined parts extending in an inclined direction upward from each of the pair of connection parts, respectively; and a flat part connected between the pair of inclined parts;

wherein each of the plurality of reinforcement parts has each of both ends fastened to the filter frame; and wherein each of the plurality of reinforcement parts is disposed to be spaced apart from the intake filter.

16. The air cleaner of claim 15, further comprising a rubber pad mounted on the third reinforcement part.

17. The air cleaner of claim 15, wherein the first reinforcement part, the second reinforcement part, and the third reinforcement part are an I-beam having an I-type cross section.

18. The air cleaner of claim 15, wherein each of the first reinforcement part and the second reinforcement part comprises:
- a pair of fastening parts formed with fastening holes into which fastening pins formed on the intake filter are inserted;
- a pair of inclined parts extending in an inclined direction upward from each of the pair of fastening parts, respectively; and
- a flat part connected between the pair of inclined parts.

19. The air cleaner of claim 18, wherein an insulator made of a rubber material is provided on an inner surface of the fastening holes.

20. The air cleaner of claim 15, wherein the filter frame comprises:
- a first frame part; and
- a second frame part disposed opposite to and parallel with the first frame part.

* * * * *